United States Patent
Arbuckle (10) Patent No.: US 6,802,656 B2
(45) Date of Patent: Oct. 12, 2004

(54) RETAINED HARDWARE SYSTEM AND METHOD

(75) Inventor: James F. Arbuckle, Fresno, CA (US)

(73) Assignee: Pelco, Clovis, CA (US)

( * ) Notice: Subject to any disclaimer, the term of this patent is extended or adjusted under 35 U.S.C. 154(b) by 0 days.

(21) Appl. No.: 10/305,034

(22) Filed: Nov. 26, 2002

(65) Prior Publication Data

US 2003/0103833 A1 Jun. 5, 2003

Related U.S. Application Data

(60) Provisional application No. 60/334,800, filed on Nov. 30, 2001.

(51) Int. Cl.[7] ............................................... G03B 17/02
(52) U.S. Cl. .................... 396/427; 348/143; 411/352
(58) Field of Search ................. 411/352, 353, 411/999; 396/427; 348/143, 151

(56) References Cited

U.S. PATENT DOCUMENTS

| | | | |
|---|---|---|---|
| 4,915,557 A | | 4/1990 | Stafford |
| 4,952,107 A | | 8/1990 | Dupree |
| 4,975,007 A | | 12/1990 | Molina |
| 5,052,643 A | * | 10/1991 | Law ............................ 248/56 |
| 5,336,028 A | | 8/1994 | Yamamoto |
| 5,382,124 A | | 1/1995 | Frattarola |
| 5,851,095 A | | 12/1998 | Ellis et al. |
| 5,852,754 A | | 12/1998 | Schneider |
| 6,234,691 B1 | | 5/2001 | Jones et al. |
| 6,280,131 B1 | | 8/2001 | Ellis et al. |
| 6,322,258 B1 | | 11/2001 | Ryan et al. |
| 6,354,749 B1 | | 3/2002 | Pfaffenberger, II |
| 6,468,011 B2 | * | 10/2002 | Mayer ......................... 411/353 |
| 6,468,012 B2 | | 10/2002 | Ellis et al. |

* cited by examiner

*Primary Examiner*—David M. Gray
(74) *Attorney, Agent, or Firm*—Gunster, Yoakley & Stewart, P.A.

(57) ABSTRACT

A low profile captive screw assembly used, for example, for attaching a protective cover, such that the captive screw assembly can be retracted to remove the protective cover without damaging the protective cover's seals. The low profile captive hardware assembly providing a standoff including a proximal end region, a distal end region opposite the proximal end region, and a central bore defining an interior surface. The interior surface including a threaded section. The low profile captive hardware assembly further provides a fastener including a head and a shaft, the shaft having a shank and a fastener threaded section. The fastener threaded section being interposed between the head and the shank such that when the fastener is positioned through the proximal end region of the standoff the fastener threaded section and the standoff threaded section are in engageable relation. A retaining clip positioned about the shank, the retaining clip capturing at least a portion of the fastener within the standoff.

21 Claims, 5 Drawing Sheets

RETAINED HARDWARE SYSTEM AND METHOD

CROSS-REFERENCE TO RELATED APPLICATION

This application is related to and claims priority to U.S. Provisional Application Ser. No. 60/334,800, filed Nov. 30, 2001, entitled REMOTE CONTROLLED CAMERA SYSTEM, the entirety of which is incorporated herein by reference.

STATEMENT REGARDING FEDERALLY SPONSORED RESEARCH OR DEVELOPMENT n/a

FIELD OF THE INVENTION

The present invention relates generally to captive hardware assemblies and in particular to low profile captive screw and retaining hardware.

BACKGROUND OF THE INVENTION

Captive screw assembles are commonly used to secured removable panels, covers, or enclosures when it is desired to keep the fastener in position without losing items of hardware. A captive screw assembly typically includes a housing, which is fitted into an aperture formed in, for example, a panel. A screw is inserted through the housing and retained therein with, for example, a retaining ring. Once installed, the housing retains the screw even when the screw is not engaged in a threaded bore or receiving nut. In order to provide a location to affix the retaining ring, the screw is typically arranged with a gap in its threads. This results in the undesirable situation of the screw extending beyond the housing and beyond the panel wall.

While in many instance a captive screw assembly is a desirable alternative to a non-captive screw, there can also be times when a captive screw assembly is difficult and even damaging to use. As noted above, in a typical installation, the screw portion will extend beyond the housing, making it difficult to use when panels must be flush against each other prior to screw engagement. Additionally, when captive screws are used to secure protective covers, the extending portion of the screw can damage weatherproof seals.

It is therefore desirable to have a captive screw assembly including a screw which can be retained flush within the housing prior to screw engagement.

SUMMARY OF THE INVENTION

The subject invention provides a low profile captive screw assembly for use, for example, in attaching a protective cover. As described herein, the low profile captive screw can be retracted into a standoff, such that the protective cover can be removed without damaging the cover.

The low profile captive screw assembly of the present invention includes a standoff having a central bore defining an interior surface, where the interior surface has a threaded section. A fastener having a head and a shaft and is positionable through the standoff. The shaft includes a shank and a threaded section in which the threaded section is interposed between the head and the shank. The fastener is positioned through the standoff such that the fastener threaded section and the standoff threaded section are in engageable relation. A retaining clip is positioned about the shank captures the fastener within the standoff.

In accordance with another aspect, the present invention provides a low profile captive screw assembly in which a fastener includes a head and a shaft. The shaft includes a shank and a fastener threaded section in which the fastener threaded section is interposed between the head and the shank. A standoff includes a central bore defining an interior surface in which a portion of the interior surface is threaded such that when the fastener is positioned through the central bore, the fastener threaded section and the standoff threaded portion are in engaging relation. A retainer captures at least a portion of the fastener within the standoff.

In accordance with still another aspect, the present invention provides a low profile captive hardware assembly in which a fastener includes a head and a shaft. The shaft including a shank and a fastener threaded section in which the fastener threaded section is interposed between the head and the shank. A standoff includes a central bore defining an interior surface having a thread portion and a first end region. The first end region of the standoff has a counter bore such that when the fastener is positioned through the central bore, the fastener threaded section and the standoff threaded portion are in engaging relation. A retaining clip is positioned about the shank in which the retaining clip captures the fastener within the standoff.

In accordance with still yet another aspect, the present invention provides a surveillance camera housing in which a back box is configured to receive a surveillance camera and a trim ring is engageable with the back box. At least one low profile captive hardware assembly is attached to the back box for engagement of the trim ring such that the at least one low profile captive screw assembly removeably secures the trim ring to the back box.

In accordance with yet another aspect, the present invention provides a surveillance camera housing having a back box and a trim ring. The back box is configured to receive the trim ring. The trim ring is securable to the back box with at least one low profile captive hardware assembly such that the trim ring is engageable with and disengageable from the back box without the at least one low profile captive hardware assembly damaging the trim ring.

In accordance with still yet another aspect, the present invention provides a method of securing a surveillance camera in a protective housing, the protective housing includes a housing, a trim ring, and at least one low profile captive hardware assembly including a fastener for attaching the trim ring to the housing, in which a surveillance camera is affixed with the housing. The fastener is positioned into a first position such that the fastener is flush with an inner portion of the housing. The trim ring engages with the housing. The fastener is positioned into a second position such that the fastener engages the trim ring.

In accordance with an aspect, the present invention provides a method of affixing a trim ring to a housing in which at least one low profile captive hardware assembly including a fastener is positioned into a first position such that fastener is flush with an inner portion of the housing. The trim ring is engaged with the housing. The at least one low profile captive hardware assembly is positioned into a second position such that the fastener engages the trim ring.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The subject invention advantageously provides a low profile captive screw assembly. Such an assembly may be used, for example, to attach a protective cover to a housing. As described herein, the low profile captive screw of the present invention can be retracted into a standoff, such that the protective cover can be removed without damage to the cover or the housing.

Figure 1:
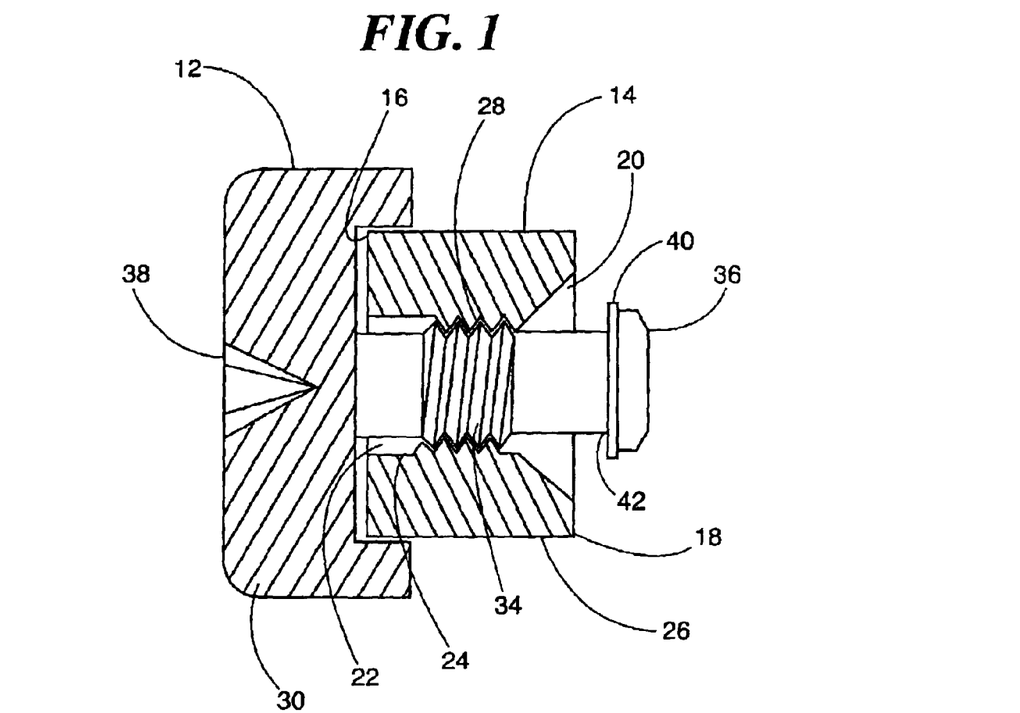
FIG. 1 is a sectional view of a captive screw assembly of the present invention in an engaged state.

Referring now to the drawing figures in which like reference designators refer to like elements, there is shown in FIG. 1 a captive screw assembly designated generally as 10. The captive screw assembly 10 of the present invention includes a fastener 12 and a standoff 14 for insertion thereof. The standoff 14 has a proximal end region 16 and a distal end region 18, where the distal end region 18 is counter bored 20 for receiving the end portion of the fastener 12. The standoff 14 further includes a central opening 22 defining an interior surface 24 and an exterior surface 26, where a portion of the interior surface 26 includes a threaded section 28.

Figure 2:
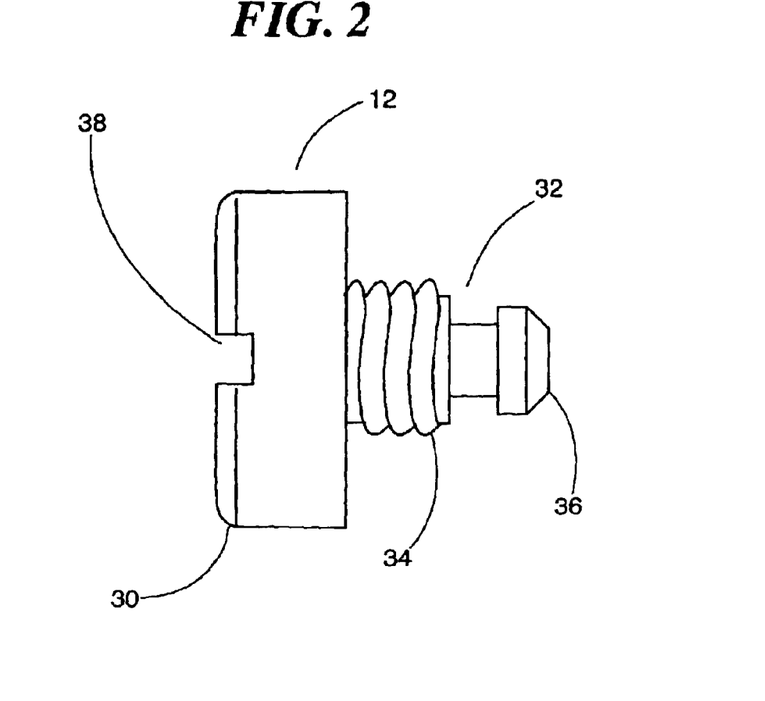
FIG. 2 is a side view of a fastener component of the captive screw assembly of the present invention.

As shown in FIG. 2, the fastener 12 includes a head 30 and a shaft 32, the shaft 32 including a threaded section 34 and a shank section 36. The fastener threaded section 34 is opposingly threaded to the standoff threaded section 28, such that the fastener 12 can be threaded into the standoff 14. For engagement, the fastener threaded section 34 is interposed between the fastener head 30 and the shank 36. The fastener head 30 is slotted 38 on its upper surface, opposite the threaded sections 34, for receiving a screwdriver, allen wrench, or other driving device. Optionally, the fastener head 30 may be arranged with a textured region on its outer circumference for enhanced gripping by a user.

Figure 3:
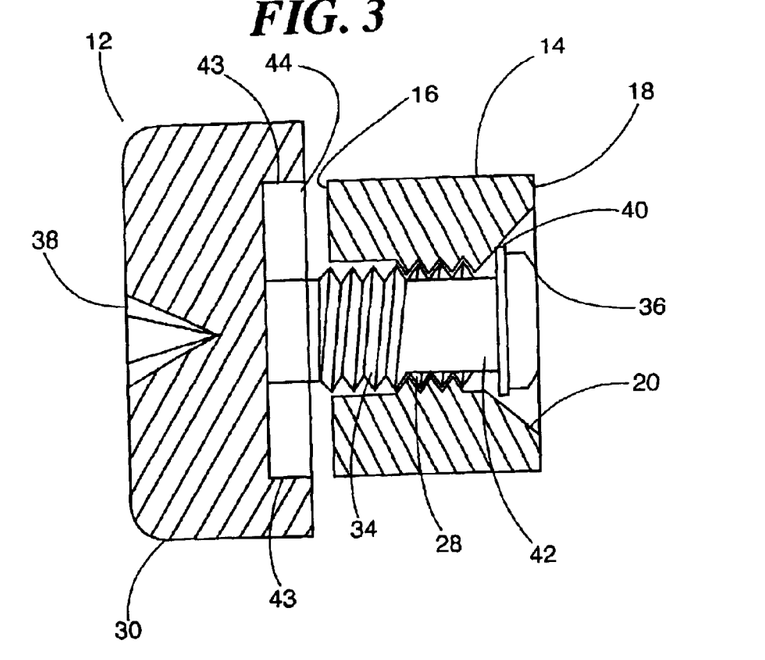
FIG. 3 is a sectional view of a captive screw assembly of the present invention in a disengaged state.

As shown in FIGS. 1 and 3, the fastener 12 is secured within the standoff 14 by inserting the fastener 12 into the standoff proximal end 16, where the fastener threaded section 34 engages the standoff threaded section 28. As the fastener 12 is threaded though the standoff 14, the fastener shank 36 extends beyond the standoff distal end region 18. A retaining clip 40 is positioned about the fastener shank 36, and is fitted about a shank grooved section 42, thereby capturing the fastener 12 within the standoff 14. The outer diameter of the retaining clip 40 is greater than the diameter of the standoff threaded section 28. When the fastener 12 is backed out though the standoff 14, the retaining clip 40 and shank 36, are drawn into the standoff distal end 18, where the retaining clip 40 and shank 36 are positioned within the counter bored section 20 of the standoff distal end region 18.

Figure 4:
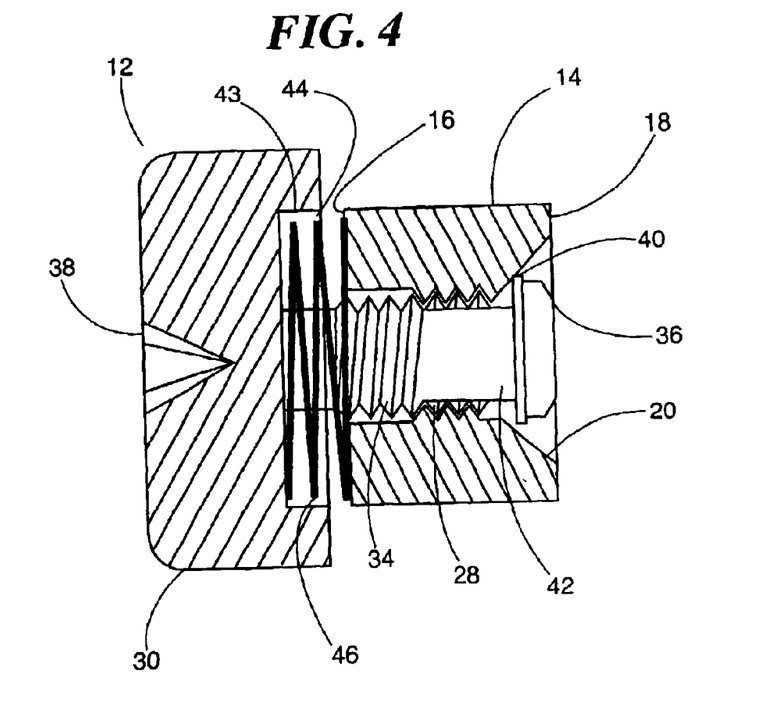
FIG. 4 is a section view of a captive screw assembly of the present invention in a disengaged state including a spring.

In the embodiment shown in FIG. 3, the fastener head 30 is hollowed to create a wall 43 defining a hollowed region 44, such that the hollowed region 44 receives a portion of the standoff proximal end region 16 when the fastener 12 engages the standoff 14. Additionally, as shown in FIG. 4, a spring 46 can be positioned about the fastener shaft 32, being interposed between the fastener head 30 and the standoff proximal end region 16. The spring 46 retains the fastener shank 36 within the counter bored section 20 of the standoff distal end 18, when the standoff and fastener thread sections 28, 32 are not engaged.

Figure 5:
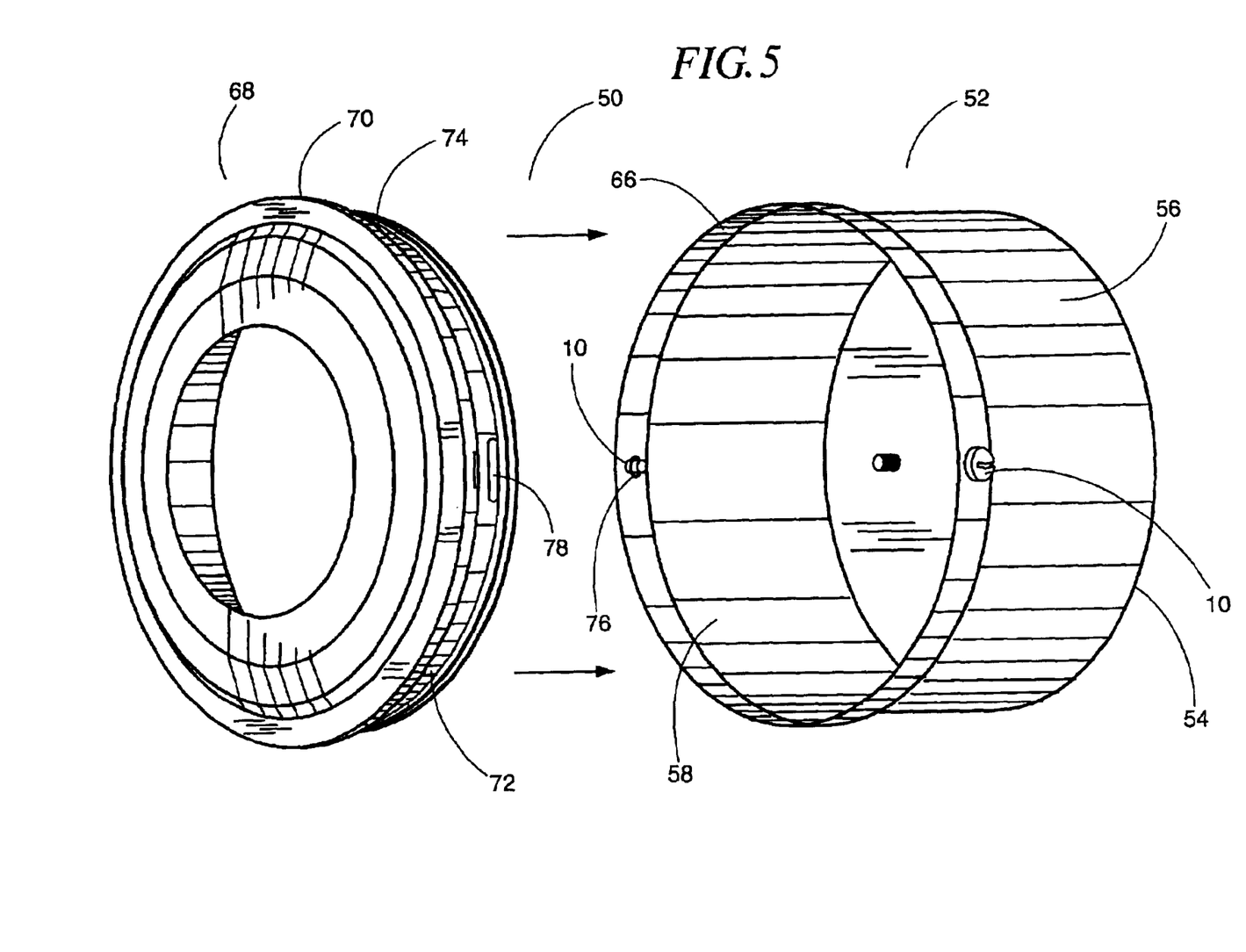
FIG. 5 is a perspective view of s camera assembly.

A use of the low-profile captive screw assembly of the present invention is more fully understood when described in conjunction with a camera cover assembly 50. As shown in FIG. 5, the cover assembly 50 includes a back box 52 and a trim ring 68. The back box 52 has a top 54 and a cylindrical wall 56 defining a cavity 58, where the cavity 58 is profiled for receiving a surveillance camera. The trim ring 68 is couplable with the back box 52, where the trim ring 68 abuts against the back box bottom flange 66, creating a protective enclosure for the surveillance camera.

Figure 6:
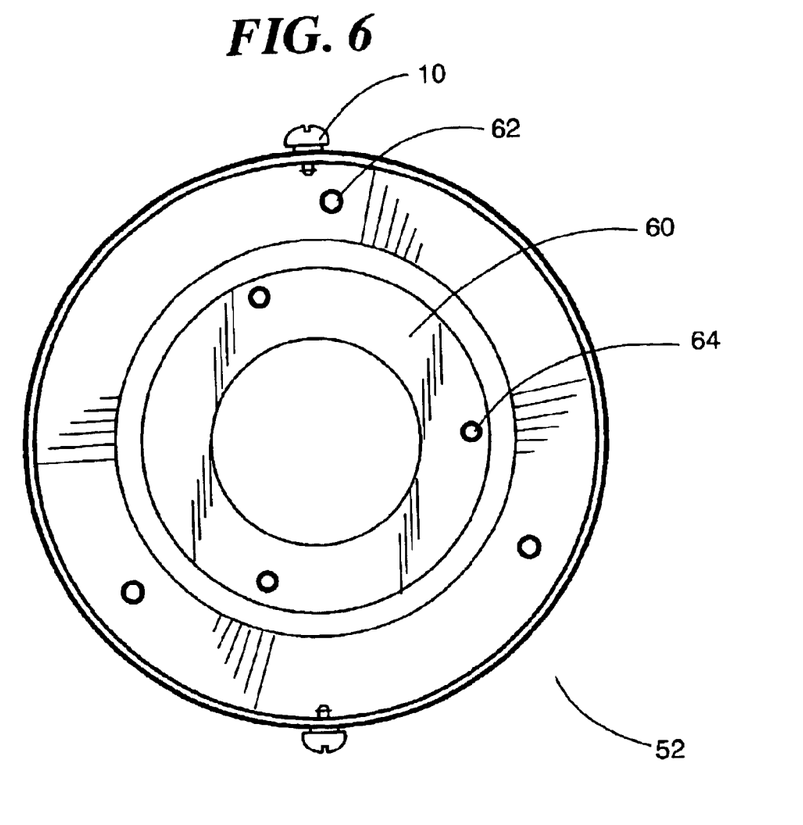
FIG. 6 is a top view of the back box of the camera assembly of FIG. 5.

As shown in FIG. 6, the back box top 54 includes a mounting flange 60. The mounting flange 60 including mounting hardware 62 for attaching the surveillance camera to the back box 52, and mounting holes 64 for securing the back box 52 into position.

Figure 7:
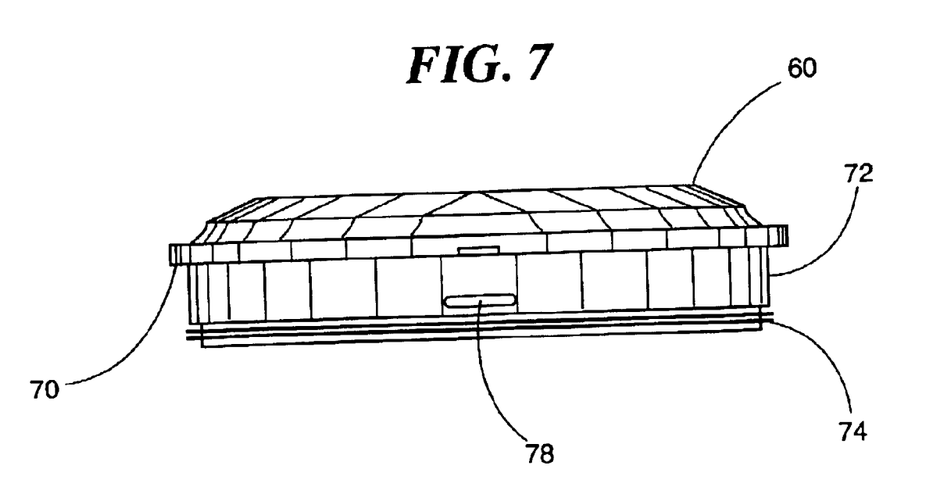
FIG. 7 is a side view of a trim ring of the camera assembly of FIG. 5.

As shown in FIG. 7, the trim ring 68 includes a peripheral flange 70 and an outwardly facing cylindrical unit 72 extending there from. At least one sealing ring 74 is positioned about the outwardly facing cylindrical unit 72. Receiving slots 78 for engagement of the shank 36 are opposingly positioned on the outwardly facing cylindrical unit 72.

Figure 8:
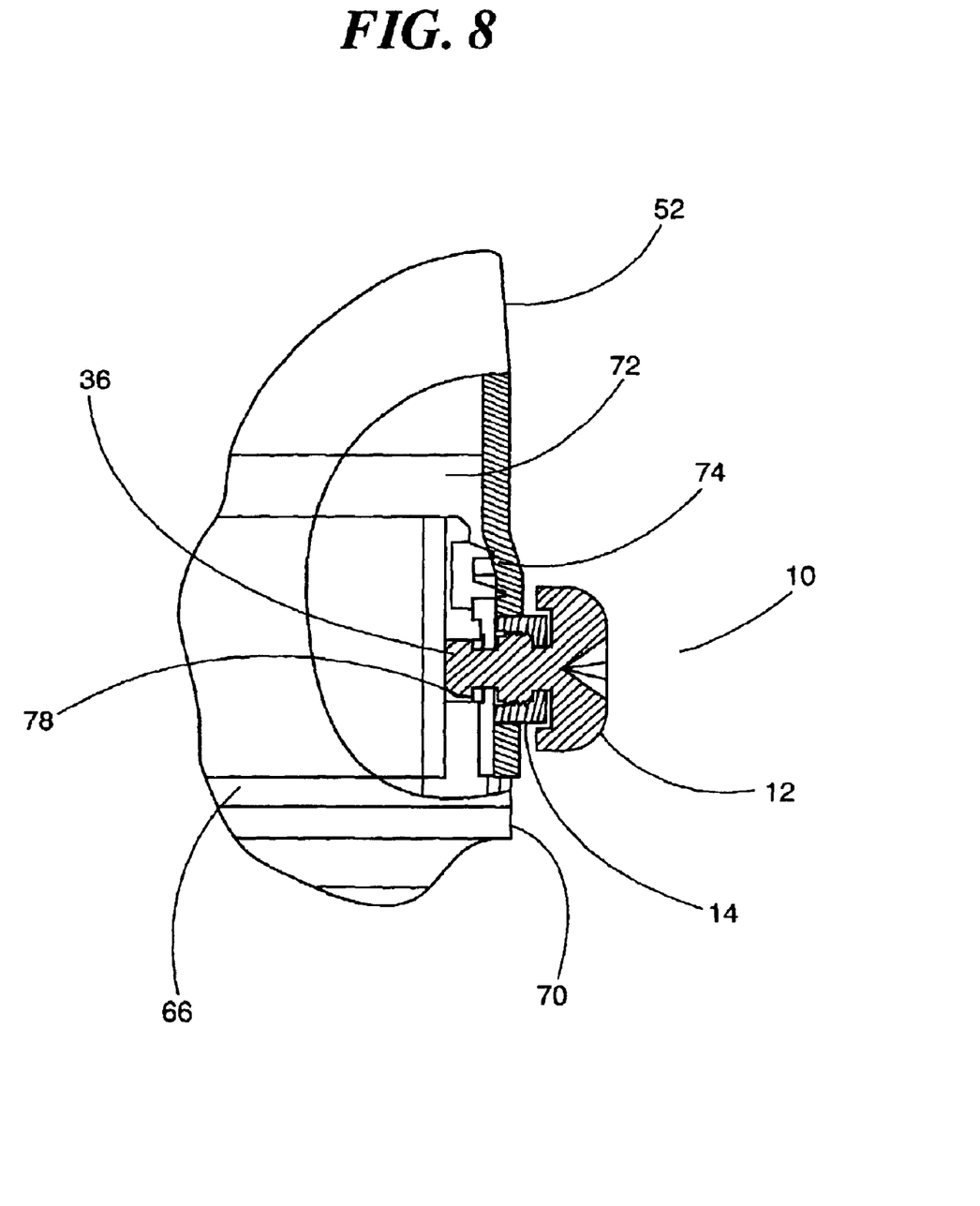
FIG. 8 is a sectional view of the assembled camera assembly, including the captive screw assembly.

As shown in FIGS. 5 and 8, to assemble the camera cover assembly 52 the trim ring 68 is coupled to the back box 52, by inserting the outwardly facing cylindrical unit 72 into the cavity 58, such that the peripheral flange 70 abuts the bottom flange 66. The sealing rings 74 are positioned between the cylindrical wall 56 and the outwardly facing cylindrical unit 72 forming a seal.

The trim ring 68 is secured to the back box 52 by means of the captive screw assembly 10. The captive screw assembly 10 is attached to the back box 52 by securing the standoffs 14 into a pair of oppositely placed retaining holes 76. The trim ring 68 is secured to the back box 52 by aligning the fasteners 12 with the receiving slots 78 and inserting the outwardly facing cylindrical unit 72 into the cavity 58, until the peripheral flange 70 abuts the bottom flange 66. The fasteners 12 are threaded into the standoffs 14, such that the fastener shanks 36 are inserted into the receiving slots 78, securing the trim ring 68 to the back box 52.

To remove the trim ring 68 from the back box 52, the fasteners 12 are backed out from the standoffs 14 such that the shanks 36 are drawn into the standoff distal ends 18, where the retaining clips 40 capture the fasteners 12 within the standoffs 14. The trim ring 52 can then removed from the back box 52, without the fastener shanks 36 damaging the sealing rings 74.

The present invention advantageously provides a captive screw assembly 10 containing a fastener 12 which can be retained flush within a standoff 14 prior to the fastener 12 threadily engaging the standoff 14.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A low profile captive hardware assembly, comprising:
   a standoff including a proximal end region, a distal end region opposite the proximal end region, and a central bore defining an interior surface, the interior surface including a standoff threaded section;
   a fastener including a head and a shaft, the shaft having a shank and a fastener threaded section, the fastener threaded section being interposed between the head and the shank such that when the fastener is positioned through the proximal end region of the standoff, the fastener threaded section and the standoff threaded section are in engageable relation; and
   a retaining clip positioned about the shank, the retaining clip capturing at least a portion of the fastener within the standoff.

2. The low profile captive hardware assembly according to claim 1, wherein the standoff further includes a counter bore at the distal end region.

3. The low profile captive hardware assembly according to claim 1, wherein the fastener further includes a grooved section interposed between the shank and the fastener threaded section, the grooved section being sized to receive the retaining clip.

4. The low profile captive hardware assembly according to claim 1, wherein the fastener head includes a hollowed region configured to receive a portion of the standoff proximal end region.

5. The low profile captive hardware assembly according to claim 1, further comprising a spring positioned about the fastener shaft, the spring being interposed between the standoff proximal end region and the fastener head to springingly bias the fastener head away from the standoff proximal end region.

6. A low profile captive screw assembly comprising:
   a fastener including a head and a shaft, the shaft including a shank and a fastener threaded section, the fastener threaded section being interposed between the head and the shank;
   a standoff including a central bore defining an interior surface, at least a portion of the interior surface being threaded such that when the fastener is positioned through the central bore the fastener threaded section and the standoff threaded portion are in engaging relation; and
   a retainer, the retainer capturing at least a portion of the fastener within the standoff,
   wherein the fastener further includes a grooved section interposed between the shank and the fastener threaded section, the grooved section being sized to receive the retainer.

7. A low profile captive screw assembly comprising:
   a fastener including a head and a shaft, the shaft including a shank and a fastener threaded section, the fastener threaded section being interposed between the head and the shank;
   a standoff including a central bore defining an interior surface, at least a portion of the interior surface being threaded such that when the fastener is positioned through the central bore the fastener threaded section and the standoff threaded portion are in engaging relation; and
   a retainer, the retainer capturing at least a portion of the fastener within the standoff,
   wherein the fastener head includes a hollowed region configured to receive a portion of the standoff.

8. A low profile captive screw assembly comprising:
   a fastener including a head and a shaft, the shaft including a shank and a fastener threaded section, the fastener threaded section being interposed between the head and the shank;
   a standoff including a central bore defining an interior surface, at least a portion of the interior surface being threaded such that when the fastener is positioned through the central bore the fastener threaded section and the standoff threaded portion are in engaging relation;
   a retainer, the retainer capturing at least a portion of the fastener within the standoff; and
   a spring positioned about the fastener shaft, and interposed between the standoff and the fastener head to springingly bias the fastener head away from the standoff.

9. A low profile captive hardware assembly comprising:
   a fastener including a head and a shaft, the shaft including a shank and a fastener threaded section, the fastener threaded section being interposed between the head and the shank;
   a standoff including a central bore defining an interior surface having a thread portion and a first end region, the first end region of the standoff having a counter bore such that when the fastener is positioned through the central bore the fastener threaded section and the standoff threaded portion are in engaging relation; and
   a retaining clip positioned about the shank, the retaining clip capturing the fastener within the standoff.

10. The low profile captive hardware assembly according to claim 9, wherein the fastener further includes a grooved section interposed between the shank and the fastener threaded section, the grooved section is sized to receive the retaining clip.

11. The low profile captive hardware assembly according to claim 9, wherein the fastener head includes a hollowed region configured to receive a portion of the standoff.

12. The low profile captive hardware assembly according to claim 9, further comprising a spring positioned about the fastener shaft and interposed between the standoff and the fastener head to bias the fastener head away from the standoff.

13. A surveillance camera housing comprising:
   a back box configured to receive a surveillance camera;
   a trim ring engageable with the back box; and
   at least one low profile captive hardware assembly attached to the back box for engagement of the trim ring, such that the at least one low profile captive hardware assembly removeably secures the trim ring to the back box.

14. The surveillance camera housing according to claim 13, wherein the back box comprises a bottom flange including a least one aperture for coupling with the at least one low profile captive hardware assembly.

15. The surveillance camera housing according to claim 13, wherein the trim ring comprises a peripheral flange including a outwardly facing cylindrical will extending there from, the outwardly facing cylindrical unit including at least one receiving slot for engaging the at least one low profile captive hardware assembly.

16. The surveillance camera housing according to claim 15, wherein the trim ring further comprises at least one sealing ring positioned about the outwardly facing cylindrical unit.

17. The surveillance camera housing according to claim 13, wherein the at least one low profile captive hardware assembly comprises:
   a standoff including a proximal end region, a distal end region opposite the proximal end region, and a central bore defining an interior surface, the interior surface including a standoff threaded section;
   a fastener including a head and a shaft, the shaft having a shank and a fastener threaded section, the fastener threaded section being interposed between the head and the shank such that when the fastener is positioned through the proximal end region of the standoff, the fastener threaded section and the standoff threaded section are in engageable relation; and
   a retaining clip positioned about the shank, the retaining clip capturing at least a portion of the fastener within the standoff.

18. A surveillance camera housing, comprising:
   a back box including at least one low profile captive hardware assembly; and
   a trim ring, the back box being configured to receive the trim ring, the trim ring being securable to the back box with the at least one low profile captive hardware assembly such that the trim ring is engageable with and disengageable from the back box without the at least one low profile captive hardware assembly damaging the trim ring.

19. The surveillance camera housing according to claim 18, wherein the at least one low profile captive hardware assembly comprises:
   a standoff including a proximal end region, a distal end region opposite the proximal end region, and a central bore defining an interior surface, the interior surface including a standoff threaded section, wherein the standoff is affixed to the back box;
   a fastener including a head and a shaft, the shaft having a shank and a fastener threaded section, the fastener threaded section being interposed between the head and the shank such that when the fastener is positioned through the proximal end region of the standoff, the fastener threaded section and the standoff threaded section are in engageable relation, such that as the fastener is threaded into the standoff the shank engages the trim ring; and
   a retaining clip positioned about the shank, the retaining clip capturing at least a portion of the fastener within the standoff.

20. A method of securing a surveillance camera in a protective housing, the protective housing including a housing, a trim ring, and at least one low profile captive hardware assembly including a fastener for attaching the trim ring to the housing, the method comprising:
   a) affixing a surveillance camera with the housing;
   b) positioning the fastener into a first position such that the fastener is flush with an inner portion of the housing;
   c) engaging the trim ring with the housing, and
   d) positioning the fastener into a second position such that the fastener engages the trim ring.

21. A method of affixing a trim ring to a housing, the method comprising:
   a) positioning at least one low profile captive hardware assembly including a fastener into a first position such that fastener is flush with an inner portion of the housing;
   b) engaging the trim ring with the housing; and
   c) positioning the at least one low profile captive hardware assembly into a second position, such that the fastener engages the trim ring.

* * * * *

UNITED STATES PATENT AND TRADEMARK OFFICE
CERTIFICATE OF CORRECTION

PATENT NO.   : 6,802,656 B2
DATED        : October 12, 2004
INVENTOR(S)  : James F. Arbuckle It is certified that error appears in the above-identified patent and that said Letters Patent is hereby corrected as shown below:

Column 6,
Line 64, "will" should read -- unit --

Signed and Sealed this

Twenty-ninth Day of March, 2005

JON W. DUDAS
*Director of the United States Patent and Trademark Office*